Patented July 22, 1952

UNITED STATES PATENT OFFICE 2,604,476

SUBSTITUTED PHTHALOCYANINES AND PROCESS FOR PREPARING THE SAME

William Owen Jones, Morden Park, England, assignor to Imperial Chemical Industries Limited, a corporation of Great Britain No Drawing. Application May 22, 1950, Serial No. 163,570. In Great Britain May 30, 1949

8 Claims. (Cl. 260—314.5)

This invention relates to new colouring matters and more particularly to new colouring matters of the phthalocyanine series.

According to my invention I provide new colouring matters of the phthalocyanine series of the formula

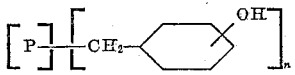

wherein P is the residue of a phthalocyanine compound to which the hydroxybenzyl groups above shown are nuclearly attached, $n$ is a whole number greater than 0 and wherein the benzene nucleus may be further substituted or form part of a condensed ring.

According to a further feature of my invention I provide a process for the manufacture of new colouring matters which comprises reacting with phenolic substances, phthalocyanine derivatives which contain in their molecular structure one or more chloromethyl groups.

The phthalocyanine derivatives used as starting materials in the process of my invention may themselves be obtained by reacting phthalocyanine compounds with dichlorodimethylether in the presence of sulphuric acid or in the presence of aluminium chloride and a tertiary base, for example pyridine.

As suitable phthalocyanine derivatives for use in the process of my invention there may be mentioned for example copper tri-, tetra-, penta-, hexa-, hepto-, or octa-(chloromethyl)-phthalocyanine and the chloromethylated derivatives of tin phthalocyanine and manganese phthalocyanine which may be obtained by reacting tin phthalocyanine or manganese phthalocyanine with aluminium chloride and sym. dichlorodimethylether in the presence of pyridine. There may also be used the chloromethylated derivatives of phthalocyanine compounds which contain pendant aryl nuclei attached directly or through a linking atom or group of atoms to the fundamental phenylene nuclei of the phthalocyanine complex and which may carry chloromethyl groups in the said pendant aryl nuclei so that the colouring matter formed carries hydroxybenzyl groups in pendant aryl nuclei.

As suitable phenols for use in the process there may be mentioned, phenol itself, hydroquinone, o-, m- or p-cresol, 1:3:5-xylenol, α-naphthol, p-hydroxydiphenyl, salicylic acid, m-, or p-methoxyphenol, p-(tertiarybutyl)-phenol, 2:4-dimethylphenol, o- or p-chlorophenol and methyl salicylate.

In carrying out the process of the invention the phthalocyanine derivative containing one or more chloromethyl groups may be heated with an excess of the phenolic substance at a suitable temperature depending on the phenolic substance used (for example 150-160° C. is a suitable temperature when phenol itself is used) until evolution of hydrogen chloride has ceased or almost ceased. Preferably the reagents are heated together in the presence of a small quantity of a suitable metallic halide, for example zinc chloride, aluminium chloride, ferric chloride, stannous chloride or mercuric chloride, when the reaction can sometimes be brought about at a somewhat lower temperature, and this forms a further feature of our invention. The metallic halide may if desired be former in situ in the reaction mixture, for example zinc oxide or zinc acetate may be added to the reaction mixture, when zinc chloride will be formed by the action of the hydrogen chloride first produced by the interaction of small amounts of the chloromethyl compound and phenol and this zinc chloride will then accelerate the interaction of the residual chloromethyl compound and phenol. In order to get the best results it is sometimes desirable to use, for each chloromethyl group, about 1 molecular proportion of the metallic halide, for example zinc chloride.

The products of the invention may be isolated by extracting or steam-distilling off the residual phenol from the crude reaction product, and if desired, when the products are soluble in alkali, dissolving the residue in caustic soda, reprecipitating by the addition of hydrochloric acid, filtering off and drying.

In the process of the invention the chlorine atoms of the chloromethyl groups are replaced by phenolic groups so that the new colouring matters contain hydroxybenzyl groups or nuclear substituted hydroxybenzyl groups. The hydroxybenzyl groups are in general believed to be predominantly o-hydroxybenzyl groups with a smaller proportion of p-hydroxybenzyl groups and a still smaller proportion of m-hydroxybenzyl groups but it will be apparent that the position of the methylene radical with respect to the hydroxy group will depend on the position and nature of the other substituents in the phenol nucleus.

The phthalocyanine derivatives made by the process of my invention are useful as colouring matters, for example for paper or textiles, or for use as spirit soluble dyestuffs in the colouring of lacquers, and they can be used as intermediates to be converted into other colouring matters, for example the alkali soluble phthalocyanine derivatives dye cotton in blue to green shades, and they can be coupled in substance or on the fibre with diazotised amines to give yellowish green shades. The new phthalocyanine derivatives whether alkali soluble or not can be sulphonated to give soluble dyestuffs and these can, if desired, be coupled in substance or on the fibre to give yellowish green shades. Also some of the new colouring matters obtained by the use of salicylic acid as the phenol, (or preferably by the use of the methyl or other ester of salicylic acid, followed by hydrolysis) may be used as chromable dyestuffs.

The invention is illustrated but not limited by the following examples in which the parts are by weight:

Example 1

72 parts of copper tri-(chloromethyl)-phthalocyanine, 2 parts of anhydrous zinc chloride and 500 parts of phenol are stirred together at 120° C. for 3 hours. The mixture is steam distilled to remove excess phenol, and then cooled and the product is filtered off, washed well with water and dried. The product may be purified by dissolving it in hot 2N caustic soda solution, filtering to remove impurities, and reprecipitating by adding dilute hydrochloric acid. The product is then filtered off, washed with water until free from acid and dried. The copper tri-(hydroxybenzyl)-phthalocyanine is a blue solid, soluble in dilute aqueous caustic soda solution and cellosolve, and slightly soluble in ethanol, acetone and ethyl acetate.

In place of the 72 parts of copper tri-(chloromethyl)-phthalocyanine used in the above example, there may be used 77 parts of copper tetra-chloromethyl)-phthalocyanine, or 82 parts of copper penta-(chloromethyl)-phthalocyanine, or 87 parts of copper hexa-(chloromethyl)-phthalocyanine, or 92 parts of copper hepta-(chloromethyl)-phthalocyanine, or 97 parts of copper octa-(chloromethyl)-phthalocyanine. The copper poly-(hydroxybenzyl)-phthalocyanines so obtained are greenish blue in colour. The greenness of shade and solubility in the solvents mentioned above increases as the number of hydroxybenzyl groups increases. The higher members have sufficient solubility in Cellosolve and ethanol to be used as spirit soluble dyestuffs for the colouring of shellac, nitrocellulose or urea formaldehyde resin lacquers.

Example 2

72 parts of copper tri-(chloromethyl)-phthalocyanine and 41 parts of zinc chloride are added to 500 parts of phenol, and the mixture is stirred at 90° C. for 2 hours. The product is isolated and may be purified as described in Example 1.

In place of the 72 parts of trichloromethyl compound and 41 parts of zinc chloride used in the above example, there may be used the quantities of other chloromethyl compounds and quantities of zinc chloride used in the following table:

| | Phthalocyanine derivative Parts | Parts of zinc chloride |
|---|---|---|
| Copper tetra-(chloromethyl)-phthalocyanine | 77 | 55 |
| Copper penta-(chloromethyl)-phthalocyanine | 82 | 68 |
| Copper hexa-(chloromethyl)-phthalocyanine | 87 | 82 |
| Copper hepta-(chloromethyl)-phthalocyanine | 92 | 95 |
| Copper octa-(chloromethyl)-phthalocyanine | 97 | 109 |

The properties of the products are very similar to those of the corresponding products prepared by the method of Example 1.

Example 3

In place of the phenol used in Example 1 there may be used an equal amount of one of the following phenolic compounds: o-cresol, p-cresol, o-chlorophenol, p-chlorophenol, hydroquinone monomethyl ether or resorcinol monomethyl ether.

Example 4

72 parts of copper tri-(chloromethyl)-phthalocyanine and 41 parts of zinc chloride are stirred with 500 parts of p-(tertiarybutyl)-phenol at 115° C. for 1½ hours. The excess phenol is removed by steam distillation, the residual suspension is cooled and the product is filtered off, washed well with water and dried.

In place of the 72 parts of tri-(chloromethyl)-compound and 41 parts of zinc chloride used in the above example, there may be used the quantities of other chloromethyl compounds and quantities of zinc chloride shown in the table in Example 2. The products have better solubility in acetone and ethyl acetate than the corresponding products from phenol.

Example 5

In place of 500 parts of p-(tertiarybutyl)-phenol used in Example 4, there are used 250 parts of 2:4-dimethylphenol. The products obtained have very similar properties to those of the corresponding products of Example 4.

Example 6

144 parts of copper tri-(chloromethyl)-phthalocyanine, 82 parts of zince chloride and 1000 parts of methyl salicylate are stirred together at 165° C. during 2 hours. The mixture is then steam-distilled to remove excess methyl salicylate, and the blue product is filtered off, washed with water, dried and finely ground. The product is added to a stirred solution of 100 parts of caustic potash in 2000 parts of β-ethoxyethanol, and the mixture is stirred at 120° C. during 1½ hours. The mixture is diluted to 20,000 parts with water and then filtered, and the product is precipitated from the filtrate by adding dilute hydrochloric acid. The product is filtered off, washed acid-free and dried at 70° C. The product is soluble in dilute aqueous sodium carbonate solution to form a greenish-blue solution, and it may be used as a lake-forming dyestuff.

The product may be sulphonated by dissolving it in 4 parts of oleum containing 5% of free sulphur trioxide, stirring the solution at 25° C. for 30 minutes, and then at 75° C. for 45 minutes. The sulphonated derivative may then be isolated by pouring the reaction mixture into a mixture of ice and water and filtering off the precipitate. The product is a greenish-blue solid which dissolves in dilute aqueous sodium carbonate solution to form a greenish-blue solution, and it may be used as a lake forming dyestuff, or as a printing dyestuff for use with a chromium or aluminium mordant.

Example 7

164 parts of copper penta-(chloromethyl)-phthalocyanine, 136 parts of zinc chloride and 1000 parts of methyl salicylate are stirred together at 165° C. during 2 hours and the excess methyl salicylate is then removed by steam distillation and the blue product is filtered off, hydrolysed in a solution of 150 parts of caustic potash in 2000 parts of β-ethoxyethanol at 120° C. for 1½ hours. The product is isolated as described in Example 6. The product is greener in shade than the product of Example 6.

*Example 8*

In place of the 164 parts of copper penta-(chloromethyl)phthalocyanine and 136 parts of zinc chloride used in Example 7 there are used 183 parts of copper hepta-(chloromethyl) phthalocyanine and 190 parts of zinc chloride. The product is greener in shade than that of Example 7.

*Example 9*

24 parts of manganese tri-(chloromethyl)-pthalocyanine, 24 parts of zinc chloride and 125 parts of phenol are stirred at 80° C. for 30 minutes. The product is isolated and purified as described in Example 1.

In place of the 24 parts of manganese tri-(chloromethyl)-phthalocyanine used in the above example there may be used 24 parts of stannous tri-(chloromethyl)-phthalocyanine.

*Example 10*

The amounts of chloromethylated phthalocyanine and aluminium chloride shown in the following table are stirred in 500 parts of phenol at 100° C. for 2 hours:

|  | Phthalocyanine derivative Parts | Parts of aluminium chloride |
|---|---|---|
| Copper tri-(chloromethyl)-phthalocyanine | 72 | 40 |
| Copper tetra-(chloromethyl)-phthalocyanine | 77 | 53 |
| Copper penta-(chloromethyl)-phthalocyanine | 82 | 67 |
| Copper hexa-(chloromethyl)-phthalocyanine | 87 | 80 |
| Copper hepta-(chloromethyl)-phthalocyanine | 92 | 93 |
| Copper octa-(chloromethyl)-phthalocyanine | 97 | 107 |

The products are isolated and purified as described in Example 1. They have very similar properties to those of the corresponding products prepared by the methods of Examples 1 and 2.

What I claim is:

1. Coloring matters of the phthalocyanine series having the formula—

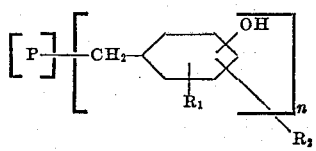

wherein P is the radical of a phthalocyanine compound to which the hydroxybenzyl groups, above shown, are nuclearly attached, $R_1$ is selected from the group consisting of hydrogen and lower alkyl, $R_2$ is selected from the group consisting of hydrogen, lower alkyl, halogen, lower alkoxy, phenyl, carboxy and carbo-lower alkoxy, and $n$ is a whole number greater than 0.

2. New colouring matters of the formula

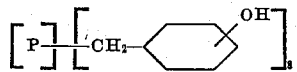

wherein P is the radical of copper phthalocyanine.

3. A process for the manufacture of coloring matters of the phthalocyanine series which comprises reacting a phthalocyanine compound containing in its molecular structure at least one chloromethyl group, with a phenolic substance, the reaction being effected by heating the reactants together at a temperature sufficient to evolve hydrogen chloride.

4. Process according to claim 3 wherein the reaction is carried out in the presence of a metallic halide.

5. Process according to claim 3 wherein the reaction is carried out in the presence of zinc chloride.

6. A process for the manufacture of coloring matters of the phthalocyanine series which comprises heating together a phthalocyanine containing in its molecular structure at least one chloromethyl group, and a phenolic substance at a temperature sufficient to evolve hydrogen chloride and continuing the heating until the evolution of hydrogen chloride has substantially ceased.

7. The process of claim 6 wherein the reactants are heated together in the presence of a metallic halide which is formed in situ.

8. The process of claim 7 wherein one molecular proportion of metallic halide is employed for each chloromethyl group.

WILLIAM OWEN JONES.

No references cited.